United States Patent Office 2,893,878
Patented July 7, 1959

2,893,878

PROCESS FOR RETARDING NON-ENZYMATIC BROWNING OF POTATOES

Morris Simon, Chicago, and Joseph R. Wagner, Downers Grove, Ill., assignors to the United States of America as represented by the Secretary of the Army No Drawing. Application June 11, 1956
Serial No. 590,796

4 Claims. (Cl. 99—207)

(Granted under Title 35, U.S. Code (1952), sec. 266)

The invention described herein, if patented, may be manufactured and used by or for the Government for governmental purposes, without the payment to us of any royalty thereon.

The invention relates to a process for retarding the non-enzymatic browning of potatoes, and more particularly, to a process whereby the non-enzymatic discoloration of dehydrated potatoes is substantially inhibited during prolonged periods of storage at room temperature extending over several months' duration, as well as to the dehydrated potato product obtained by such process.

Potatoes, and particularly dehydrated potatoes have a pronounced tendency to discolor to a grayish brown upon prolonged periods of storage, which phenomenon is sometimes referred to as the "browning reaction." While the discolored product is neither toxic nor lacking in nutritive value, it nevertheless has an unappetizing appearance which makes it unacceptable to a majority of prospective consumers. This "browning reaction" has been the object of much study, and two major causes therefor have been established: enzymatic action, and certain non-enzymatic processes, the latter probably due to changes occurring in the sugars and amino compounds present in the product. Enzymatically caused discoloration can be combated by various treatments, such as blanching (e.g., steam-blanching) and/or the high frequency electrical treatment shown in U.S. Patent 2,569,075, Schade, assignor to the Government of the United States. However, many brands of potatoes, particularly those rich in certain sugars and amino compounds still suffer from browning, particularly in the dehydrated state, even if enzymatic changes are inhibited. This is a marked handicap to the produce dehydrator because he is unable to utilize economically those brands of potatoes, inasmuch as the dehydrated product will lose the original white color, and therewith its consumer acceptability, within a few weeks of storage. It has been attempted heretofore to combat the discoloration of potatoes by a pre-treatment with a sulfiting agent, such as sodium bisulfite and/or sodium sulfite. However, this sulfiting treatment is almost ineffective with certain brands of potatoes such as "White Rose," even for short storage periods and for storage periods of the order of six months at room temperature loses its protective effect altogether. It has also been proposed to protect the potatoes against the "browning reacion" by a pre-treatment consisting of immersion in a hot solution of calcium chloride, which removes a substantial portion of the sugars and amino compounds responsible for non-enzymatic browning. However, this treatment affects the taste of the rehydrated product unfavorably, presumably because some of the removed compounds are contributors to the characteristic desirable flavor of a potato dish; moreover, some discoloration is still observable in the dehydrated product after prolonged storage of the order of six months.

Accordingly it is a principal object of our invention to overcome these shortcomings of the prior art, and to provide a process for treating potatoes which will protect them against non-enzymatic discoloration upon prolonged storage, particularly in the dehydrated state, without adversely affecting the flavor of the product.

Another object of our invention is the process which uses readily available inorganic chemical treating agents, familiar to the food trade.

Another object of our invention is a treatment which can be easily controlled even by relatively inexperienced food producers, and is inexpensive from the standpoint of cost of ingredients and machinery.

A further object of our invention is a protective process which can be conveniently applied to batches of potatoes particularly susceptible to non-enzymatic discoloration, as well as to mixed batches of potatoes which contain some susceptible brands as part of the components of the mixed batch.

Still further objects and advantages of our invention will appear from the following detailed description of several preferred examples of carrying the same into practice.

We have found as a result of an extended experimentation and prolonged storage tests that a spraying treatment of a non-enzymatic deactivated (e.g. steam-blanched) potato with calcium chloride and a water-soluble sulfiting agent dissolved in water in such concentration as to deposit certain effective amounts of calcium chloride and of sulfite on the potato will protect the potato against non-enzymatic discoloration during storage over extended periods, say of 3 or even 6 months' duration. Even such brands of potatoes which are highly susceptible to non-enzymatic discoloration after enzymatic deactivation, such as "White Rose" potatoes are effectively protected by this treatment. As the result of colorimetric measurements, we have found, surprisingly, that the effect of this treatment is not merely additive, i.e., equal to the sum of the effect of the calcium chloride and sulfite ingredients of the treating solution, but synergistic, particularly after long storage of the order of 6 months. Thus, in the case of steam blanched and dehydrated "White Rose" potatoes, it was found in a series of controlled experiments that the sulfiting pre-treatment (without calcium chloride) resulted in substantially the same discoloration after 6 months' storage, as the controlled sample which had not been subjected to sulfiting or any other treatment for protecting it against non-enzymatic discoloration; on the other hand, a sample sprayed with a solution of calcium chloride and sodium bisulfite, in accordance with our invention, showed substantially less discoloration, after 6 months' storage, than yet another sample sprayed with the calcium chloride solution alone. This shows the synergistic nature of our treatment inasmuch as the sulfiting treatment, which is ineffective by itself in some brands of potatoes after prolonged storage, nevertheless materially enhances the protective effect of the calcium chloride.

In the case of brands of potatoes more resistant to non-enzymatic discoloration than "White Ross" potatoes, e.g., "Russet Burbank" potatoes, our treatment is also highly effective, in that it makes it possible to eliminate even traces of discoloration of the dehydrated product after prolonged storage, as distinguished from the slight but nevertheless noticeable non-enzymatic discoloration observable after treatment with either sulfite or calcium chloride by themselves.

The spraying treatment according to our invention does not leech out any appreciable amounts of sugars and/or amino compounds naturally present in the products. Tests by taste panels conducted on rehydrated products treated in accordance with our invention showed substantially the same flavor acceptability of the potato dishes prepared therefrom as that of potato dishes prepared from fresh potatoes.

While our invention is not specifically concerned with an improvement in the enzymatic deactivation of potatoes, it should nevertheless be emphasized that effective enzymatic deactivation, e.g., by steam blanching for about 3 minutes, is important in conjunction with our invention because enzymatically active potato products will discolor rapidly even after subjection to the calcium chloride and sulfite spraying treatment of the present invention.

Effective protection against non-enzymatic discoloration after long periods of storage in accordance with the present invention can be accomplished by adding relatively small amounts of calcium chloride and of sulfite, even as low as about .1 part by weight of calcium ions and .015 parts by weight of sulfite ions (as $SO_2$) per 100 parts by weight of potatoes. However, for best protective effects, we recommend the addition of calcium ions to the extent of about .4 part or more and of sulfite ions to the extent of .02 part or more per 100 parts by weight of dehydrated potatoes. Flavor tests have shown that the calcium chloride content may be as high as about .8 part of calcium ions per 100 parts by weight of dehydrated potatoes, without imparting an objectionable flavor to the rehydrated product; sulfiting up to about .05 part by weight of sulfite ions (as $SO_2$) per 100 parts by weight of dehydrated potatoes is effective, and no appreciable additional protective effect is achieved by sulfiting above that figure.

Potatoes contain trace amounts of calcium, naturally present therein of the order of about .01 to .03 part per 100 parts by weight of dehydrated potatoes; therefore, in analyzing potatoes treated in accordance with our invention, allowance should be made for such calcium naturally present. Thus if a sample containing .03 part by weight of naturally present calcium assays at .64 part of calcium after addition of calcium chloride, the added calcium chloride is .61 part as calcium ions.

We now proceed to describe several samples of our invention by way of illustration rather than by way of limitation:

EXAMPLE 1

A batch of California "White Rose" potatoes was peeled, trimmed, cut into "dice" of ⅜ x ⅜ x 3/16" dimensions, and enzymatically deactivated by steam blanching for 3 minutes at 212° F. This batch was then divided into six samples which were then subjected to the following treatments respectively:

1. Spraying with water (control).
2. Spraying with .084% sodium bisulfite.
3. Spraying with .114% sodium bisulfite.
4. Spraying with .2% calcium chloride.
5. Spraying with .104% sodium bisulfite and 2% calcium chloride.
6. Spraying with .186% sodium bisulfite and 2% calcium chloride.

⅔ pounds of spray solution per pound of blanched potatoes was employed in each case. All samples were then dehydrated to 7% moisture content and analyzed for calcium and sulfite content (as $SO_2$), with the results shown in Table I. Each sample was then again subdivided into two sub-samples and each sub-sample was placed in a hermetically sealed container and stored at sub-tropical temperature (100° F.). The first sub-sample of each sample was removed from storage after 3 months, and the second sub-portion after 6 months. Non-enzymatic discoloration ("browning") of each sub-portion was determined colorimetrically by measuring the color of an acetone solution of the acetic acid soluble color extract of each sample and sub-sample in an Evelyn photoelectric colorimeter (manufactured by Rubicon Company, Philadelphia, Pennsylvania), prior to storage and after removal from storage.

The following results were observed:

*Table I*

| | Contents | | Colorimeter Reading | | | "Browning" (Color Increase) | |
|---|---|---|---|---|---|---|---|
| | Ca (Percent) | $SO_2$ (p.p.m.) | Before Storage | 3 Months' Storage | 6 Months' Storage | 3 Months' Storage | 6 Months' Storage |
| Sample 1 | [1].03 | | .045 | .166 | .380 | .121 | .335 |
| Sample 2 | [1].03 | 220 | .036 | .147 | .406 | .111 | .370 |
| Sample 3 | [1].03 | 400 | .041 | .145 | .371 | .104 | .330 |
| Sample 4 | .64 | | .045 | .077 | .160 | .032 | .115 |
| Sample 5 | .50 | 150 | .037 | .062 | .132 | .025 | .095 |
| Sample 6 | .64 | 380 | .040 | .048 | .120 | .008 | .080 |

[1] Calcium naturally present.

It will be observed from this table that samples 5 and 6, which were treated in accordance with our invention, showed a "browning" (color increase) of less than .100 after 6 months' storage, and substantially less "browning" than sample 4 (treated with calcium chloride alone), while samples 2 and 3, which were only sulfited, showed as much and even more "browning" (non-enzymatic discoloration) than control sample 1. Even the abbreviated storage tests (3 months' storage) showed the "browning" of samples 5 and 6 to be materially less than that of sample 4 and much less than samples 2 and 3.

EXAMPLE 2

Example 1 was repeated, except that "Russet Burbank" potatoes were used instead of "White Rose" potatoes. Example 1 (control) was sprayed with water. Examples 2 to 6 were sprayed with solutions of similar concentrations as (but somewhat higher NaHSO₃ content than) in Example 1. The analyses of the samples, and the "browning" results observed are set forth in Table II.

*Table II*

| | Contents | | Colorimeter Reading | | | "Browning" (Color Increase) | |
|---|---|---|---|---|---|---|---|
| | Ca (Percent) | $SO_2$ (p.p.m.) | Before Storage | 3 Months' Storage | 6 Months' Storage | 3 Months' Storage | 6 Months' Storage |
| Sample 1 | [1].03 | | .017 | .056 | .137 | .039 | .120 |
| Sample 2 | [1].03 | 310 | .020 | .025 | .060 | .005 | .040 |
| Sample 3 | [1].03 | 530 | .019 | .022 | .054 | .003 | .035 |
| Sample 4 | .64 | | .024 | .030 | .054 | .006 | .030 |
| Sample 5 | .40 | 290 | .018 | .019 | .043 | .001 | .025 |
| Sample 6 | .43 | 330 | .022 | .019 | .032 | 0 | .010 |

[1] Calcium naturally present.

It can be observed from the data of Table II that samples 5 and 6 ("Russet Burbank" potatoes treated in accordance with our invention) showed no "browning" after 3 months' storage and only very light "browning" after 6 months' storage. This repression of the "browning reaction" in a brand of potatoes having substantial inherent resistance to "browning" is particularly valuable in that it assures a virtually unchanged visual appearance of the dehydrated product even after a long period of storage at sub-tropic temperatures (100° F.).

While in the foregoing examples, sodium bisulfite has been cited as the sulfiting agent, other water-soluble sulfiting agents, as for instance sodium sulfite, potassium sulfite, potassium bisulfite, or mixtures of two or more sulfiting agents may be employed; similarly, it is immaterial for the practice of our invention whether the calcium chloride and sulfiting agent are sprayed on from the same solution or in succession. While sulfite content is usually expressed in parts per million (p.p.m.) it can be converted into percent or parts by weight per 100 parts, by dividing by 10,000 (e.g., 100 p.p.m.=.01% or .01 part by weight per 100 parts).

Having thus described the principle and several examples of our invention, we realize that changes and modifications of the specific data set forth herein will readily appear to the expert, without departing from the spirit of our invention, and we desire to encompass such changes and modifications within the scope of our invention, which is defined in the subjoined claims.

We claim:

1. Process of retarding the non-enzymatic discoloration of enzymatically deactivated potatoes during prolonged periods of storage, comprising spraying said potatoes with calcium chloride and a water-soluble sulfiting agent dissolved in water so as to deposit on said potatoes at least about .1 part by weight of calcium ions and at least about .015 part by weight of sulfite ions per 100 parts by weight of said potatoes on a dehydrated basis, and dehydrating said sprayed potatoes; whereby a dehydrated potato product capable of prolonged storage without substantial discoloration and of being reconstituted into a natural-appearing and natural-tasting potato dish is produced, said product being further characterized by the presence of natural potato flavors including sugars and amino compounds.

2. Process according to claim 1, wherein about .4–.8 part by weight of calcium ions and about .02–.05 part by weight of sulfite ions per 100 parts by weight of dehydrated potatoes are deposited on said potatoes.

3. Process of retarding the non-enzymatic discoloration of enzymatically deactivated potatoes during prolonged periods of storage, comprising spraying said potatoes with calcium chloride and sodium bisulfite dissolved in water so as to deposit on said potatoes at least about .1 part by weight of calcium ions and at least about .015 part by weight of sulfite ions per 100 parts by weight of said potatoes on a dehydrated basis and dehydrating said sprayed potatoes; whereby a dehydrated potato product capable of prolonged storage without substantial discoloration and of being reconstituted into a natural-appearing and natural-tasting potato dish is produced, said product being further characterized by the presence of natural potato flavors including sugars and amino compounds.

4. Process according to claim 3, wherein about .4–.8 part by weight of calcium ions and about .02–.05 part by weight of sulfite ions per 100 parts by weight of dehydrated potatoes are deposited on said potatoes.

References Cited in the file of this patent

UNITED STATES PATENTS

| | | |
|---|---|---|
| 1,259,631 | King | Mar. 19, 1918 |
| 2,475,838 | Johnson et al. | July 12, 1949 |
| 2,681,285 | Hendel et al. | June 15, 1954 |

OTHER REFERENCES

United States Department of Agriculture, Agricultural Research Service Publication ARS-73-2, entitled Potato Flakes—A New Form of Dehydrated Mashed Potatoes, pp. 2-3 relied upon.